United States Patent [19]
Ball et al.

[11] Patent Number: 5,534,993
[45] Date of Patent: Jul. 9, 1996

[54] DUAL-WAVELENGTH FREQUENCY-CHIRPED MICROWAVE AMCW LADAR SYSTEM

[75] Inventors: Gary A. Ball, Simsbury; Leon A. Newman, Glastonbury, both of Conn.

[73] Assignee: United Technologies Corporation, Hartford, Conn.

[21] Appl. No.: 260,136

[22] Filed: Jun. 15, 1994

[51] Int. Cl.$^6$ .................................................. G01C 3/00
[52] U.S. Cl. ........................................ 356/5.09; 356/5.15
[58] Field of Search .............................. 356/5.11, 5.09, 356/5.15, 28.5

[56] References Cited

U.S. PATENT DOCUMENTS

| | | | |
|---|---|---|---|
| 4,721,385 | 1/1988 | Jelalian et al. | 356/5.09 |
| 4,729,653 | 3/1988 | Kobayashi | 356/4.09 |
| 4,932,775 | 6/1990 | Wissman et al. | 356/5.09 |

OTHER PUBLICATIONS

Optic Letters vol. 17, No. 6, 15 Mar. 1992, pp. 420–422, G. A. Ball and W. W. Morey, "Continuously tunable single–mode erbium fiber Laser".

SPIE, vol. 1799 (1992), pp. 120–124, G. L. Abbas et al, "Ladar Fiber Optic Sensor System for Aircraft Applications".

Electronics Letters, vol. 29, No. 18, 2 Sep. 1993, pp. 1623–1624, G. A. Ball et al, "Low Noise Single Frequency Linear Fiber Laser".

IEEE Photonics Technology Letters, vol. 6, No. 2, Feb. 1994, pp. 192–194, G. A. Ball et al, "60 mW 1.5 μm Single–Frequency Low–Noise Fiber Laser MOPA".

*Primary Examiner*—Thomas H. Tarcza
*Assistant Examiner*—Pinchus M. Laufer
*Attorney, Agent, or Firm*—Gerald L. DePardo

[57] ABSTRACT

An amplitude modulated continuous wave (AMCW) laser radar (ladar) system is provided with a dual-wavelength source 10 which provides a dual wavelength signal 12 (one fixed and one chirped) which is launched down a fiber 28 to a target 38 and reflected back along the fiber 28 and the return detected by a detector 52. The transmitted signal is detected by a detector 56. The detectors 52, 56 provide an electrical return beat signal and reference beat signal, respectively, indicative of the difference between the wavelengths incident thereon. The signals are fed to a frequency mixer 60 which subtracts the two beat frequencies and signal processing logic 64 computes the distance to the target 38. Using dual wavelengths and beat frequencies provides a much broader chirp bandwidth than conventional ladar techniques, and allows for higher power sources, thereby reducing range error.

4 Claims, 3 Drawing Sheets

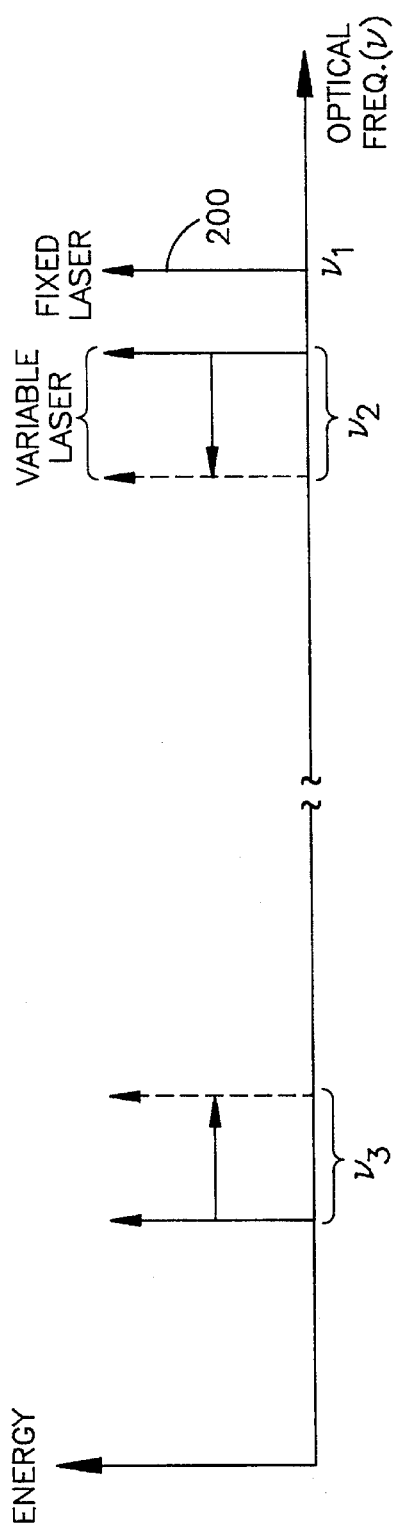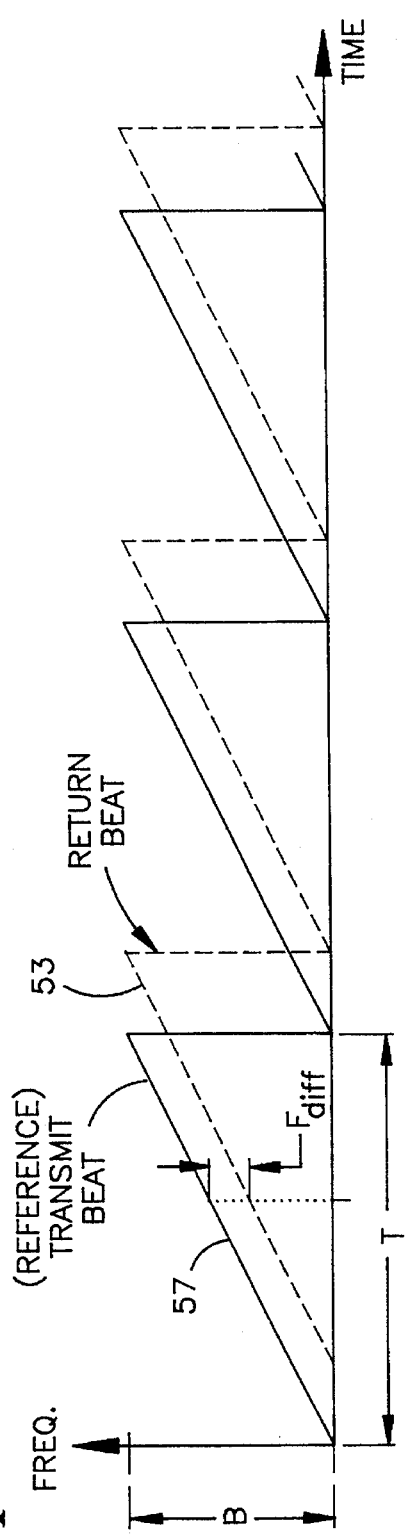

DUAL-WAVELENGTH FREQUENCY-CHIRPED MICROWAVE AMCW LADAR SYSTEM

TECHNICAL FIELD

This invention relates to laser radar (ladar) systems, and more particularly to frequency-chirped microwave sources for ladar systems.

BACKGROUND ART

It is known in the art of fiber amplitude-modulated continuous wave (AMCW) laser radar (ladar) systems to launch an amplitude-modulated frequency-chirped (or linearly ramped frequency) optical signal toward a target, typically traveling partially along an optical fiber. The range of frequencies over which the amplitude is chirped is typically in the microwave range. The light reflects off the target, propagates back to the fiber, and is detected by an optical detector. Because the signal is frequency-chirped, the frequency of the transmitted (or reference) signal will be different from (typically ahead of) the frequency of the return (or reflected) signal at the time the return signal is detected. This frequency difference will be indicative of the time delay between the transmitted and reflected signals (knowing the chirp-rate of the transmitted signal). The time delay is related in a known way to the distance to the target. Such a system is described in the article: G. L. Abbas et al, "Ladar Fiber Optic Sensor System for Aircraft Applications," SPIE Vol. 1799 (1992) pgs. 120–124.

Also, as is known, the range or distance to the target is a function of the chirped bandwidth (i.e., the range of microwave frequencies over which the optical amplitude is modulated), the chirp duration time over which the frequency is ramped, and the speed of light. Accordingly, the error associated with the determination of range to the target is proportional to the square root of $1/B^2 T P_s$; where B is the chirp bandwidth, T is the chirp duration, and $P_s$ is the signal power returning to the detector, as is discussed in the aforementioned Abbas article.

Current systems use a microwave electronic drive circuit to modulate the optical amplitude of a laser diode over a microwave frequency range, 2–8 GHz, to provide the amplitude-modulated frequency-chirped transmitted signal. However, this requires expensive and complex electronics. Also, due to the frequency limitations of microwave electronic circuits, the chirp bandwidth is limited to about 10 GHz, thereby fixing the minimum range error at a corresponding value related thereto. Also, the power of a typical laser diode capable of providing such a source is about 1 mW, thereby also fixing the minimum range error to something proportional thereto.

Thus, it would be desirable to provide an amplitude-modulated frequency-chirped microwave source that can be adapted to such a ladar fiber optic sensor which allows for reduced range error over present microwave chirp sources and reduces the cost of presently-used electronic sources.

DISCLOSURE OF INVENTION

Objects of the invention include provision of a amplitude-modulated frequency-chirped microwave source for operation with an amplitude-modulated continuous wave (AMCW) laser radar (ladar) system, having increased bandwidth, reduced cost, and increased optical power over present systems.

According to the present invention a dual-wavelength frequency-chirped microwave AMCW ladar system comprises a dual wavelength optical source, which provides an optical signal having a first wavelength and a second wavelength, the second wavelength being varied with time; a reference detector, which detects the optical signal and which provides a reference beat signal having a reference beat frequency indicative of the difference between the first and second wavelengths; a return detector, which detects the optical signal after the optical signal has traveled a predetermined distance and which provides a return beat signal having a return beat frequency indicative of the difference between the first and the second wavelengths; and the difference between the return beat frequency and the reference beat frequency at the time the return beat frequency is detected being a difference frequency, the difference frequency being related to the distance traveled by the optical signal.

According further to the present invention, a target is disposed in the path of the optical signal which reflects the optical signal back to the return detector as a target return signal; and the difference frequency is related to the distance from the source to the target. In particular, it is related to the difference between (1) the distance from the source to the target and from the target to the return detector, and (2) the distance from the source to the reference detector.

The invention represents a significant improvement over prior art microwave chirp sources by providing a dual-wavelength laser source comprising two low-noise Bragg grating fiber lasers which are coupled together, one of which is frequency tunable over a wide bandwidth. The tunable laser is a continuously tunable fiber laser which is strain-tuned, and at a 1.55 μm lasing wavelength easily provides frequency tuning of 1000 GHz, which is considerably greater than that achievable by either direct or external laser modulation. The other laser has a fixed output wavelength.

The dual wavelength laser source provides two optical signals which, when detected, are interfered (or beat, or heterodyned) together and which provide a resulting beat frequency which (at any instant in time) is equal to the difference between the two lasing frequencies. Because one laser is linearly chirped (or tuned) with respect to the other, the resultant beat frequency is also chirped.

The invention allows for a much larger frequency chirp range (or chirp bandwidth), increased power, and low relative intensity noise, which yields increased resolution and reduced range error.

The foregoing and other objects, features and advantages of the present invention will become more apparent in light of the following detailed description of exemplary embodiments thereof as illustrated in the accompanying drawings.

BRIEF DESCRIPTION OF DRAWINGS

FIG. 3 is a graph of lasing frequencies of two lasers, one of which is varying, and the corresponding detected beat frequencies, in accordance with the present invention.

FIG. 4 is a graph of a chirped reference beat signal and a delayed chirped return beat signal, in accordance with the present invention.

BEST MODE FOR CARRYING OUT THE INVENTION

Figure 1:
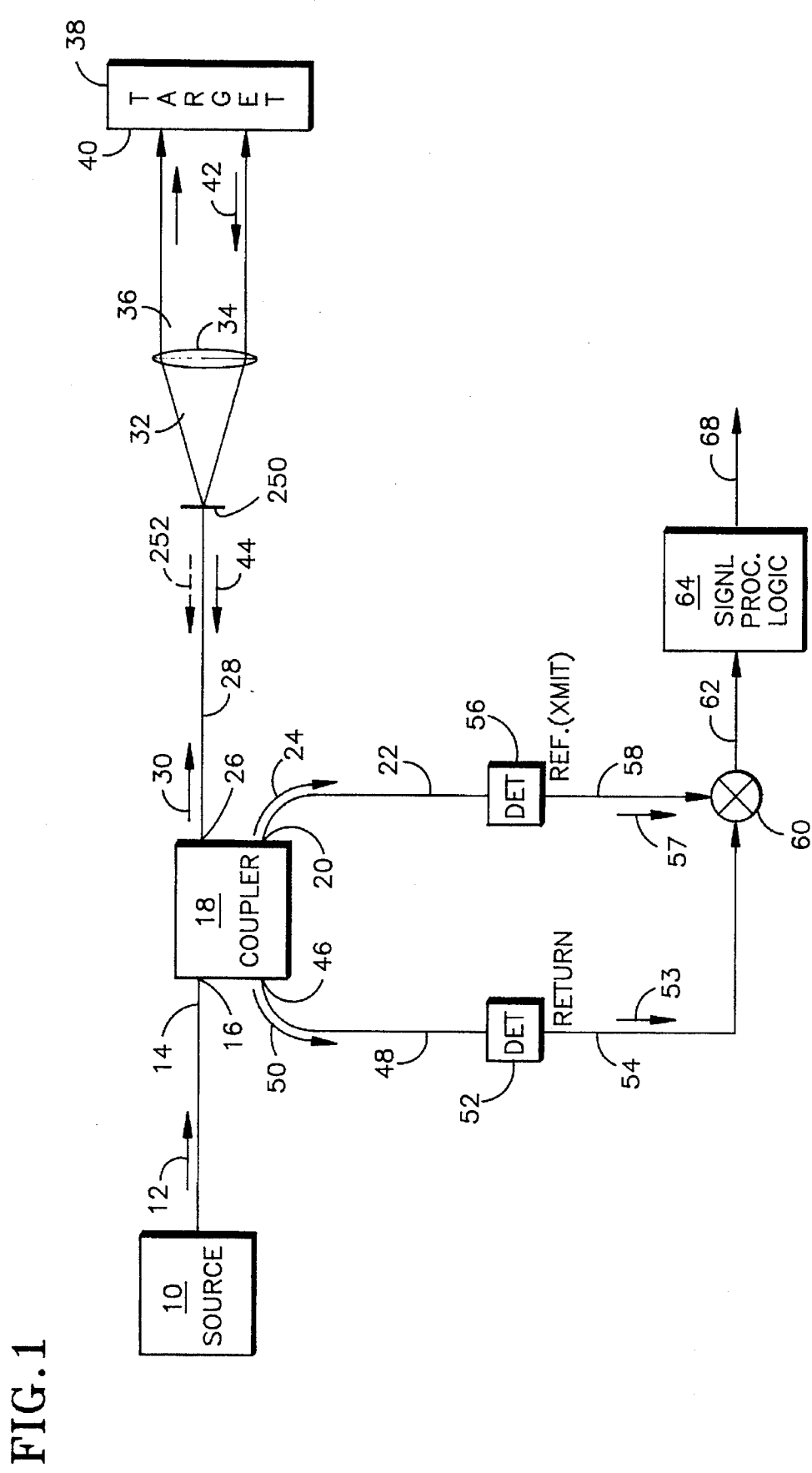
FIG. 1 is a schematic block diagram of a range detection system employing a frequency-chirped optical microwave source, in accordance with the present invention.

Referring to FIG. 1, a microwave chirp source 10 provides an optical signal 12 comprising a pair of lasing wavelengths (or lasing frequencies) which co-propagate along an optical fiber 14, one of the wavelengths being fixed and the other being varied (or chirped), as discussed hereinafter. The optical signal 12 propagates along the optical fiber 14 to a first port 16 of an optical coupler 18. A portion of the signal 12 on the fiber 14 is coupled to a port 20 on a fiber 22 as a signal 24. The remaining portion of the signal 12 on the fiber 14 is coupled to an output port 26 of the coupler 18 along a fiber 28 as indicated by a line 30. The light 30 propagates along the fiber 28, and exits the fiber 28 as to divergent laser light 32. The light 32 is incident on a lens 34 which provides a collimated light beam 36. The beam 36 is incident on a movable target 38 which has a surface 40 which is reflective.

The light 36 is reflected off the target 38 as indicated by the arrow 42 and is incident on the lens 34 which provides light 44 to the fiber 28. The light 44 reenters the coupler 18 at the port 26 and exits the coupler 18 from a port 46 along a fiber 48 as indicated by a line 50.

The fiber 48 is fed to a photodetector 52 which provides an electrical signal 53 indicative of the light 50 as the feedback (or return or reflected) signal from the target 38 on a line 54. Similarly, the reference light 24 from the coupler 18 on the fiber 22 is fed to a photodetector 56 which provides an electrical signal 57 indicative of the light 24 on a line 58. It should be understood that all the optical signals 12,24, 30,36,42,44,50 comprise two lasing wavelengths from the source 10 and that, when detected at the detectors 52,56, these two wavelengths together create a "beat" (or heterodyne) frequency indicative of the difference between these two wavelengths at any give time (discussed more hereinafter). Consequently, the signal on the line 58 is a frequency-chirped reference beat signal and the signal on the line 54 is a frequency-chirped return beat signal delayed in time by the additional time it took to propagate to the target 38 and return back to the detector 52 (see FIG. 4).

The beat signals 53,57 on the lines 54,58, respectively, are provided to an electronic mixer 60 which provides an electrical signal on a line 62, indicative of the frequency difference between the reference beat signal on the line 58 and the return beat signal on the line 54. The signal on the line 62 is thus indicative of the difference between (1) the distance from the source 10 to the target 38 and from the target 38 to the return detector 52, and (2) the distance from the source 10 to the reference detector 56.

The line 62 is fed to known signal processing logic 64 which provides an electrical signal on a line 68 indicative of the range R to the target, by calculating the range based on the known equation:

$$R = (F_{diff} * C * T)/(B * 2) \qquad \text{Eq. 1}$$

where $F_{diff}$ (see FIG. 4) is the frequency difference between the transmitted (or reference) signal and the return (or reflected) signal, c is the speed of light, T is the chirp (or ramp) duration (or period), B is the chirp bandwidth (or range over which the frequency is chirped).

The signal processing logic 64 contains known electronic circuits and memory capable of calculating the distance to the target. It should be understood that the details of the signal processing logic 64 are not critical to the present invention.

Figure 2:
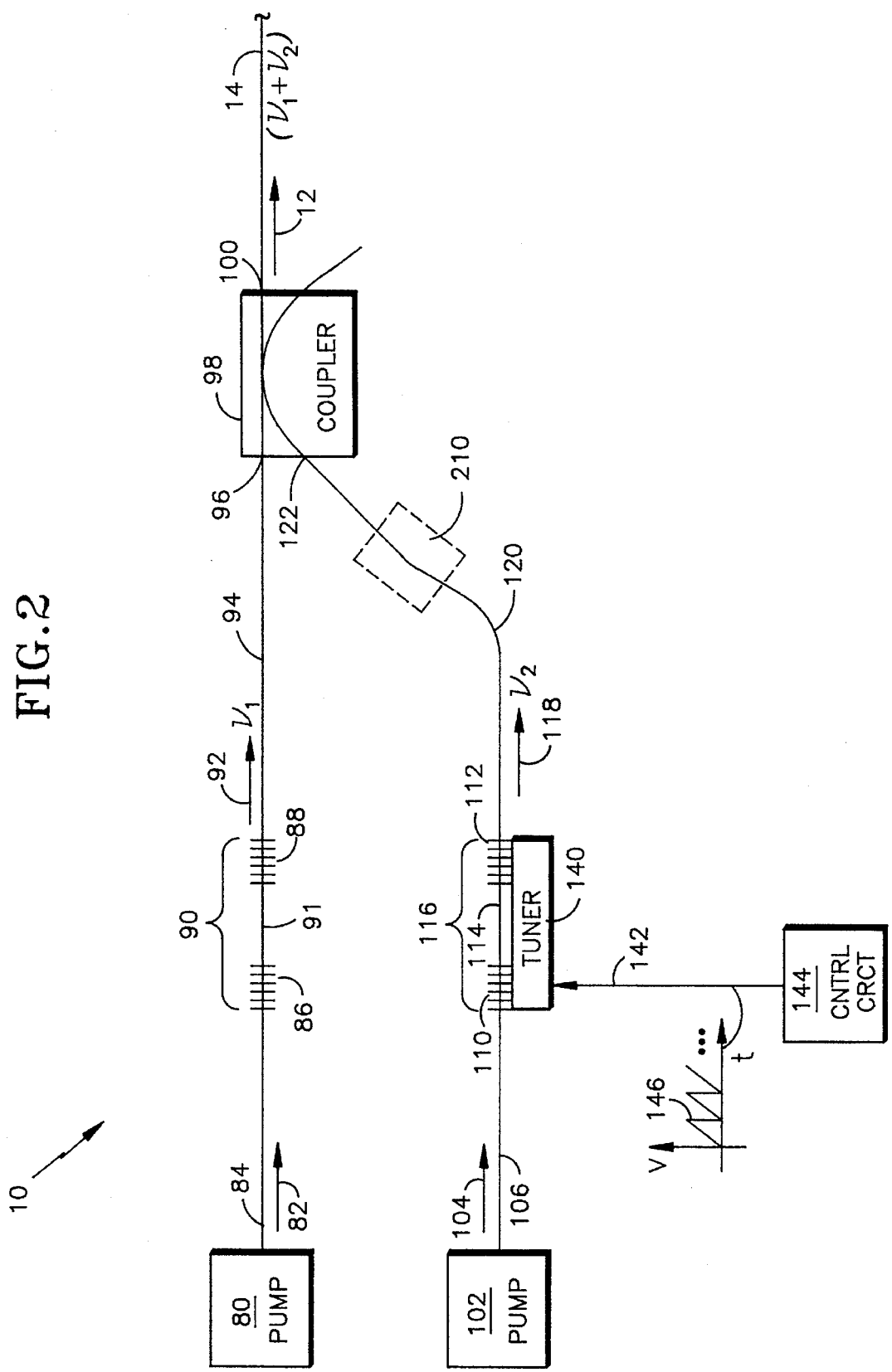
FIG. 2 is a schematic block diagram of the frequency-chirped optical microwave source, in accordance with the present invention.

Referring now to FIG. 2, the frequency-chirped dual-wavelength source of the present invention comprises a first optical pump source 80 which provides a pump-light signal 82 onto a fiber 84. The fiber 84 has a pair of gratings 86,88 impressed therein to form a fiber laser 90. The fiber 91 between the gratings 86,88 is doped with a rare earth dopant, e.g., erbium. The fiber laser 90 provides an output signal 92 along the fiber 94. The fiber 94 is fed to a first port 96 of a coupler 98.

Similarly, a second optical pump source 102 provides an optical signal 104 along a fiber 106 to a pair of gratings 110,112. The fiber 114 between the gratings 110,112 is doped with a rare earth dopant, e.g., erbium. The gratings 110,112 and the fiber 114 make up a fiber laser 116. The fiber laser 116 provides an output light 118 on a fiber 120 which is fed to the coupler 98 at a port 122. The laser light 92 and 118 are combined in the coupler and exit the coupler 98 at the port 100 onto the fiber 14 of FIG. 1 as indicated by the line 12.

A piezoelectric stretcher (or tuner) 140 is disposed on the fiber laser 116. The tuner 140 changes in length in response to an electrical signal on a line 142 from a control circuit 144. The control circuit 144 provides the chirped electronic drive signal which determines the chirp bandwidth and the chirp rate of the optical signals. In particular, the signal on the line 142 from the control circuit 144 might look like a saw tooth waveform 146 where the tuner linearly stretches the fiber laser over a predetermined range and then abruptly returns to its original position. Other waveforms may be used if desired.

In response to such stretching, the fiber laser 116 changes its lasing frequency due to the increased length of the cavity and the change in the Bragg gratings spacing as is discussed in the article: Ball et al, "Continuously tunable single-mode erbium fiber laser," Optics Letters Vol. 17, No. 6 (Mar. 15, 1992). This configuration allows the optical lasing frequency output 118 to vary (or be chirped) linearly and repetitively across a predetermined optical lasing frequency range. As a result, the difference between the lasing frequencies of the lasers 90,116 will change accordingly. For example, a continuously tunable fiber laser can be linearly strained-tuned and, at a 1.55 μm lasing wavelength, can easily provide frequency tuning of 1000 GHz difference between the two lasers. Other lasing wavelengths may be used if desired.

An example of a fiber laser configuration suitable for each of the two fiber laser sources of FIG. 2 is described in Ball et al "60 mW 1.5 μm Signal-Frequency Low-Noise Fiber Laser MOPA" IEEE Photonics Technology Letters, Vol. 6, No. 2 (February 1994); and Ball et al "Low Noise Single Frequency Linear Fibre Laser," Electronics Letters, Vol. 29 No. 18, pgs 1623–1624, (September 1993). The fiber lasers discussed in these articles employ intensity noise reduction techniques which are also applicable with the present invention if desired.

Provided the light 92 and the light 118 are polarized the same or at least have some component in the same polarization, the two light signals 92,118 will beat together to form the beat signal at the output of the photodetectors 52,56 (FIG. 1), as discussed hereinbefore and discussed more hereinafter. To achieve this objective, one of the lasers 90,114 may be manually rotated with respect to the other. Alternatively, an optional polarizer 210 may be used to align the polarizations of the two optical signals 92,118. Moreover, the optimal system design should optimize polarization matching at the detectors 52,56, e.g., by using polarization maintaining fiber, and/or in the selection of the type of target to be used. Optimal polarization matching will yield the highest contrast mode beat frequency and provide maximum signal-to-noise ratio, which results in maximum resolution. Other techniques may be used if desired to ensure beating occurs between the two signals at the output of the optical detectors 52,56.

Referring now to FIG. 3, an example of the varying beat frequencies seen at the output of the detectors 52,56 is shown for a given point in time. The lasing frequency of the output light 92 (FIG. 2) from the fixed wavelength fiber laser 90 is indicated by a line 200 at a frequency $v_1$, and the lasing frequency of the variable wavelength laser light 118 (FIG. 2) from the variable wavelength fiber laser 116 is indicated by a frequency range $v_2$. Both frequencies $v_1$, $v_2$ are near 1.55 wavelength for erbium doped fiber lasers. Other frequencies may be used if desired.

The difference between these two optical frequencies $(v_1-v_2)$, $\Delta v$, is indicated as a range of frequencies $v_3$, e.g., about 1–100 GHz. The frequency $v_3$ is the "beat" frequency which exists when the co-propagating optical frequencies are converted to an electrical signal by an optical detector. Such a beat frequency phenomenon is described in co-pending U.S. patent application Ser. No. 08/069231, "Active Multipoint Fiber Laser Sensor," filed May 28, 1993.

Referring to FIG. 1, the two laser frequencies making up the signal 12 on the fiber 14 are provided by the two fiber lasers 90,116 (FIG. 2) from the source 10. The wavelength associated with the laser 116 is changing (being chirped) with time and the other is fixed. These two wavelengths are detected by the detector 56 which provides the electrical reference beat frequency signal 57 on the line 58 indicative of the difference between the two lasing wavelengths at any given time. Because one of the lasing wavelengths is changing with time, the difference or beat frequency at the output of the detector 56 is also changing with time but at a much lower frequency (i.e., in the microwave frequency range, which is the range of interest for ladar applications).

These two laser frequencies also propagate down the fiber 28 as the optical signal 30, are reflected off the target 38, and return as the signal 44, which is ultimately detected by the detector 52. The detector 56 provides the electrical return beat frequency signal 53 on the line 54 which is indicative of the frequency difference between the two laser wavelengths, and which is delayed relative to the reference beat frequency signal (see FIG. 4).

Referring now to FIG. 4, because both the reference (or transmit) beat signal and the return beat signal are chirped, the resultant waveforms at the detectors 52,56 are similar to that obtained using prior art ladar techniques but having a much larger bandwidth (B) than that currently available from current microwave chirp sources. Therefore, this aids in reducing the range error. Furthermore, the lasers 90,116 (FIG. 2) have much higher power, e.g., 100 mW each, than that of the individual laser diode currently used in the prior art. Thus, the invention allows a greater number of position sensors to be used with the single optical source of the invention. Also, due to this higher optical power, the range error is much lower than that of conventional systems, depending on the number of targets detected using a single source.

Referring to FIG. 1, additional return signals may be used if desired to eliminate having to compensate for changes in the optical path lengths (due to environmental or other effects) from the coupler 18 to the reference detector 56, from the coupler 18 to the return detector 52, or from the coupler 18 to the end of the fiber 28, as described in the aforementioned Abbas article. For example, an optional additional reflection point 250 may be placed in the fiber 28, e.g., by a Bragg grating or other technique, which would provide an additional reflected signal 252 back along the fiber 28 and to the detector 52. In that case, it should be understood that there would be four different wavelengths incident on the detector 52 (two from the target and two from the intermediate reflector 250). This will thus cause more beat frequencies which must be distinguished; thus one should be aware of where these frequencies are to avoid confusion in distance calculation. Further, there may need to be some minimum distance between the intermediate reflector and the target to avoid spectral overlap of the window function in signal processing which would cause inaccurate distance calculation. More than one intermediate reflector may be used if desired, as discussed in the aforementioned Abbas article.

Also, it should be understood that instead of having one fiber laser providing a varying wavelength and the other one fixed, both fiber lasers may be varying in wavelength if desired.

Also, instead of detecting the distance to a target, the invention may be used in any application where the propagation time of light is used to determine the distance. For example, the invention may be used to determine the length of a fiber if desired. Alternatively, the invention may be used as a temperature or strain sensor by determining the change in length of the fiber due to temperature or strain, respectively.

Although the invention has been described and illustrated with respect to the exemplary embodiments thereof, it should be understood by those skilled in the art that the foregoing and various other changes, omissions and additions may be made without departing from the spirit and scope of the invention.

We claim:

1. A dual-wavelength frequency-chirped microwave AMCW ladar system, comprising:

a dual wavelength optical source, which provides an optical signal having a first wavelength and a second wavelength, said second wavelength being varied with time;

a reference detector, which detects said optical signal and which provides a reference beat signal having a reference beat frequency indicative of the difference between said first and second wavelengths;

a return detector, which detects said optical signal after said optical signal has traveled a predetermined distance and which provides a return beat signal having a return beat frequency indicative of the difference between said first and said second wavelengths; and the difference between said return beat frequency and said reference beat frequency at the time said return beat frequency is detected being a difference frequency, said difference frequency being related to the distance traveled by said optical signal.

2. The ladar system of claim 1 further comprising:

a target, disposed in the path of said optical signal, which reflects said optical signal back to said return detector as a target return signal; and said difference frequency being related to the distance from said source to said target.

3. The ladar system of claim 2 further comprising:

an intermediate reflector, disposed in a predetermined location along the path of said optical signal prior to said optical signal striking said target, which reflects a portion of said optical signal back to said return detector as an intermediate return signal.

4. The ladar system of claim 3 wherein the distance between said intermediate reflector and said target is large enough to allow separation of beat frequencies created at said return detector between the wavelength components of said intermediate return signal and said target return signal.

* * * * *